INVENTOR.
LESLIE E. SODERQUIST
BY Hamilton & Cook
ATTORNEYS

Aug. 22, 1967   L. E. SODERQUIST   3,336,630
UNLOADER FOR PRESS SHAPING AND CURING PNEUMATIC TIRES
Filed Oct. 5, 1965   7 Sheets-Sheet 3

INVENTOR.
LESLIE E. SODERQUIST
BY *Hamilton & Cook*
ATTORNEYS

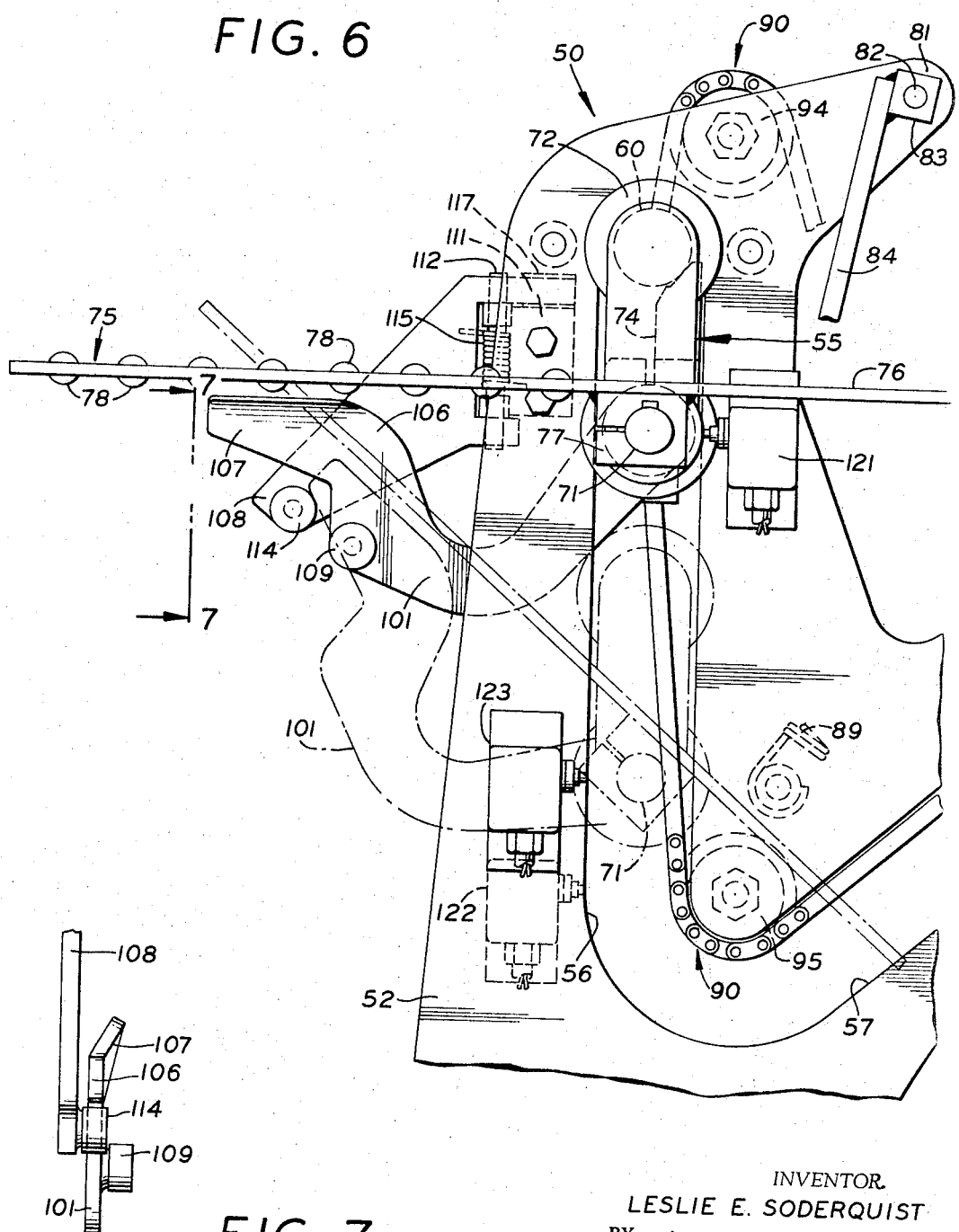

INVENTOR.
LESLIE E. SODERQUIST
BY *Hamilton & Cook*

ATTORNEYS

United States Patent Office 3,336,630
Patented Aug. 22, 1967

3,336,630
UNLOADER FOR PRESS SHAPING AND CURING
PNEUMATIC TIRES
Leslie E. Soderquist, Silver Lake, Ohio, assignor to
McNeil Corporation, Akron, Ohio, a corporation of
Ohio
Filed Oct. 5, 1965, Ser. No. 493,151
8 Claims. (Cl. 18—2)

The present invention relates to improvements in the tire presses for shaping and curing unvulcanized tire bands within separable mold sections. More particularly, the invention relates to improved apparatus for automatically unloading cured tires from shaping and curing presses. Specifically, the invention relates to unloaders for cured tires and improvements therefor.

Unloaders for cured tires are shown in a number of the inventor's prior art patents; including the most recent U.S. Patent No. 3,141,191, granted July 21, 1964.

In the prior art, each unloader has functioned for removing cured tires from a press for shaping and curing tires, the press having a lower mold section and a tire forming or center mechanism adapted to elevate the cured tire above the mold section.

In the most recent patent granted the inventor (No. 3,141,191), the unloader apparatus has been mounted on the press between and to the rear of the lower mold sections. The U-shaped unloader conveyors are movable under control of a cam means into contact with the underside of a cured tire and then to an inclined position to tilt the tire for discharge from the rear of the press. The apparatus has comprised a stanchion attached to the base of the press, a drive shaft extending transversely of the stanchion, power means on the stanchion to rotate the shaft, and actuating arms on the outboard ends of the drive shaft, each arm carrying a forwardly directed U-shaped conveyor. The movement path of the conveyors has been controlled by a conveyor mounted cam follower which engages a cam plate mounted on the stanchion, one cam plate for each conveyor.

The principal objects of the present invention are to provide unloader apparatus having a universality with respect to tire size and a versatility as to mode of operation, in addition to being less expensive to construct and easier to maintain and operate.

These and other objects of the invention, and the advantages over the prior art unloaders, will be apparent in view of the following detailed description and the drawings.

In the drawings:

FIG. 6 is a fragmentary view, similar to FIG. 1, but showing the apparatus in "active" or working positions;

FIG. 7 is a detailed view taken along line 7—7 of FIG. 6 illustrating the position of carriage guide elements in the position depicted in FIG. 3;

*The press and center mechanism*

Figure 1:
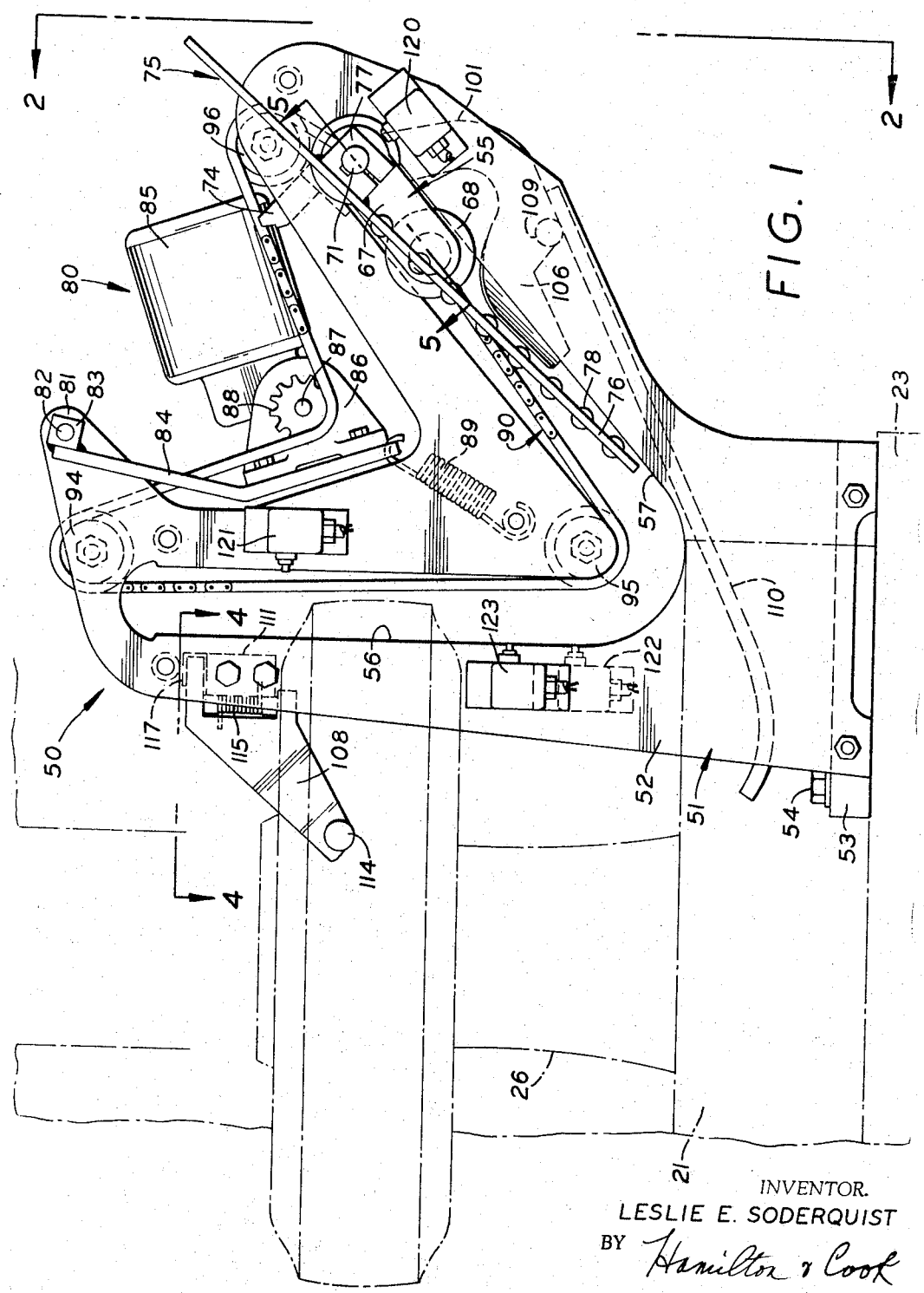
FIG. 1 is a side elevation of the improved unloader apparatus according to the invention, in the "passive" or inactive position.

A tire curing press suitable for practice of the invention has separable upper and lower mold sections, 20 and 21. The upper or movable mold sections 20 are carried on and suitably attached to the underside of a conventional heavy cross beam 22 which extends across the press and constitutes one of the links of the operating mechanism by which the press is opened or closed. The lower or stationary mold sections 21 are mounted on conventional platens attached to the base plate 23 of the press frame. Extending axially through the mold section 21, the platen and the base plate 23 and down into the press frame is a passage or well, indicated at 24, accommodating the lower portion of the permanent bag or diaphragm-type center mechanism 25.

Figure 8:
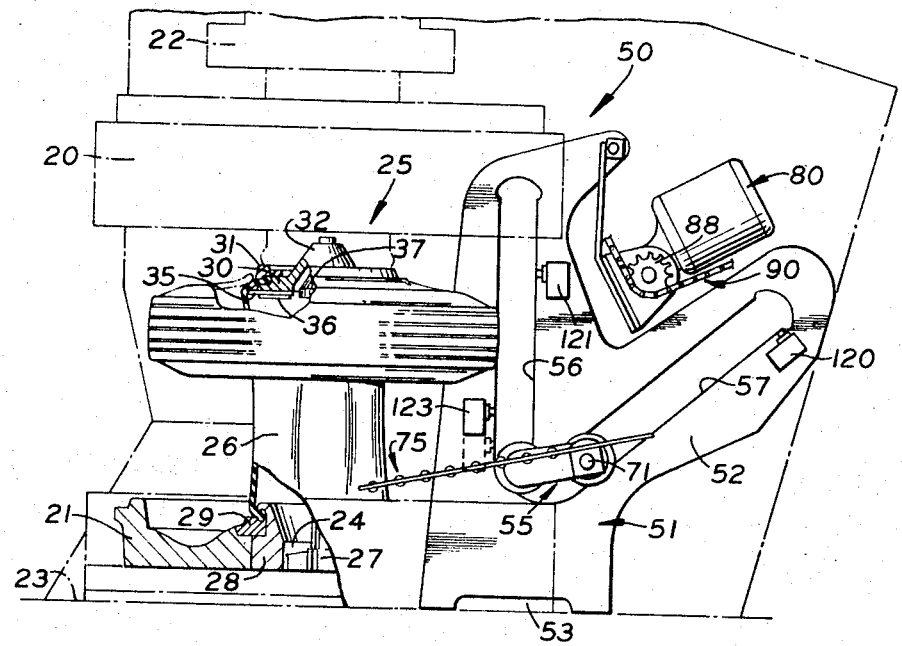
FIGS. 8, 9, 10 and 11 are views depicting sequential positions in the operation of the unloader apparatus for removing cured tires from a press when the tire forming mechanism has elevated the cured tire above the lower mold section.
Figure 9:
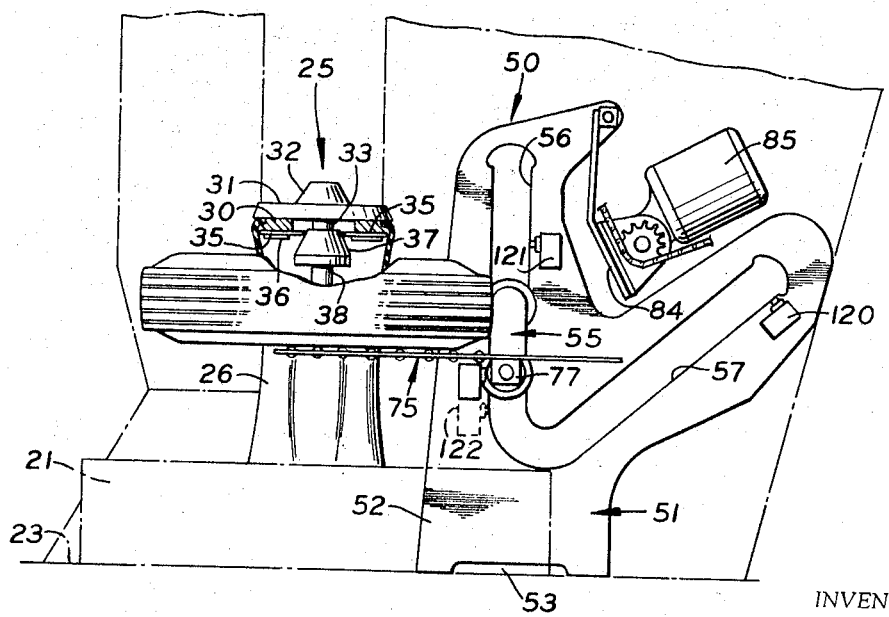

Press elements 20–24, as described bove and as indicated on FIG. 8, as well as the operating mechanisms of moving the cross beam 22, are shown in a number of prior art patents to the inventor, including U.S. Patent No. 2,808,618, granted Oct. 8, 1957, to which reference is made for such details of presses as are required to more fully understand the invention.

Referring to FIGS. 8–11, the center mechanism 25, which shapes the tire band during closing of the mold sections, strips the cured tire from the lower mold section at the end of the curing cycle. The center mechanism 25 has elements therein providing for a selective and controlled increase of the diameter of the permanent bag 26 which is between the beads of the cured tire or which is adjacent or near the upper mold section.

The permanent bag 26 is a deformable and radially distensible cylinder open at both ends. The center mechanism 25 is mounted axially of the lower mold section by a support member 27 attached to the press frame and extending downwardly through the press base well 24. The lower end of the bag 26 is closed by an assembly of a plate ring 28 and a bead ring 29 having suitably shaped circular grooves for clamping and closing the end portion of the bag. The upper end of the bag 26 is closed by an assembly of a plate ring 30 and a clamp ring 31.

The plate ring 30 is a circular member having a diameter less than the smallest diameter of an uncured tire band or a cured tire. The hub portion 32 of the plate ring is secured to the upper end of a shaft 33 carried by a piston and cylinder assembly (not shown) mounted axially of the support member 27 within the press base well 24.

Adjacent the under surface of the plate ring 30 are a plurality of radially movable elements or sectional segments 35 to increase or expand the diameter of the bag 26 (see FIG. 8) to a dimension greater than the smallest diameter dimension of a cured tire. The segments 35 are movably secured beneath the ring 30 as by a circular ring member 36. the segments 35 may be moved radially outwardly to expand the bag 26 by an actuator means or elements 37 movable longitudinally in relation to the shaft 33.

The actuator element 37 may be a plug or bullet-shaped member having a conical upper surface for sliding contact with the radially inner ends of the segments 35. The actuator 37 is carried by a cylindrical sleeve 38 surrounding the shaft 33 carried by a piston (not shown) mounted in the same cylinder and above the piston carrying the shaft 33. Fluid pressure introduced into the cylinder will provide for relative movement of the shaft 33 and actuator 37 so that the cured tire may be stripped from the lower mold 21 and made ready for operation of the unloader apparatus.

*The unloader—general description*

The unloader, or apparatus for removing cured tires from a press for shaping and curing tires and having a tire forming or center mechanism 25 adapted to elevate a cured tire above a lower mold section 21, is indicated in its entirety by the numeral 50.

The unloader 50 has a stanchion, indicated 51, mounted on the press frame preferably between and to the rear of a pair of lower mold sections 21. A stanchion 51 has parallel upright side plates. Each side plate has a downwardly pointed V-shaped slot defined by a perpendicular leg and a divergent leg. The side plate slots confine or support and guide a carriage, indicated at 55, rotatably mounting and carrying the preferably U-shaped conveyor arms, indicated at 75, for lifting and discharging a cured tire away from the center mechanism 25.

The carriage 55 and arms 75 are moved forwardly from the "passive" position (FIG. 1) through the sequential "working" positions (FIGS. 8–11) by a movably mounted drive mechanism, indicated at 80, actuating a tensioned power transmission means, indicated at 90. During forward movement of the carriage 55, the conveyor arms 75 are directed and positioned by a guide system, indicated at 100, so as to enter the area of the center mechanism 25, beneath the stripped tire, at a level or distance just above the uppermost extent of a lower mold section 21. Continued movement of the carriage 55 raises the arms 75 in a substantially horizontal plane to support and lift the cured tire for removal from contact with the center mechanism 25. Thereafter, the guide system 100 cooperates with the drive mechanism 80 to sharply incline or tilt the conveyor arms 75 downwardly and rearwardly to discharge the cured tire from the press. The return of the carriage 55 to the starting position at the rear of the stanchion 51 resets the conveyor arms 75 for support, lifting and discharge of another cured tire at the end of the next press curing cycle.

*The unloader—detailed description*

Referring to the drawings, the unloader stanchion 51 has parallel upright side plates 52 joined at their lower ends as by a base block 53. The base block is attached, as by bolts 54, to the base plate 23 of the press frame.

Each stanchion side plate 52 has a downwardly directed V-shape or arrow point slot for guiding movement of a carriage 55. The side plate slots each have a perpendicular leg 56, oriented substantially parallel to the axis of the center mechanism 25, and a divergent leg 57, directed upwardly and away from the center mechanism axis.

The unloader carriage 55, which is supported and guided throughout the extent of its working movement by the slot legs 56 and 57, is generally rectangular having a four-point suspension. At each corner of the carriage 55 are roller means, such as the ball bearings 58, closely fitting and bearing against the side surfaces of the slot legs 56 and 57.

Figure 5:
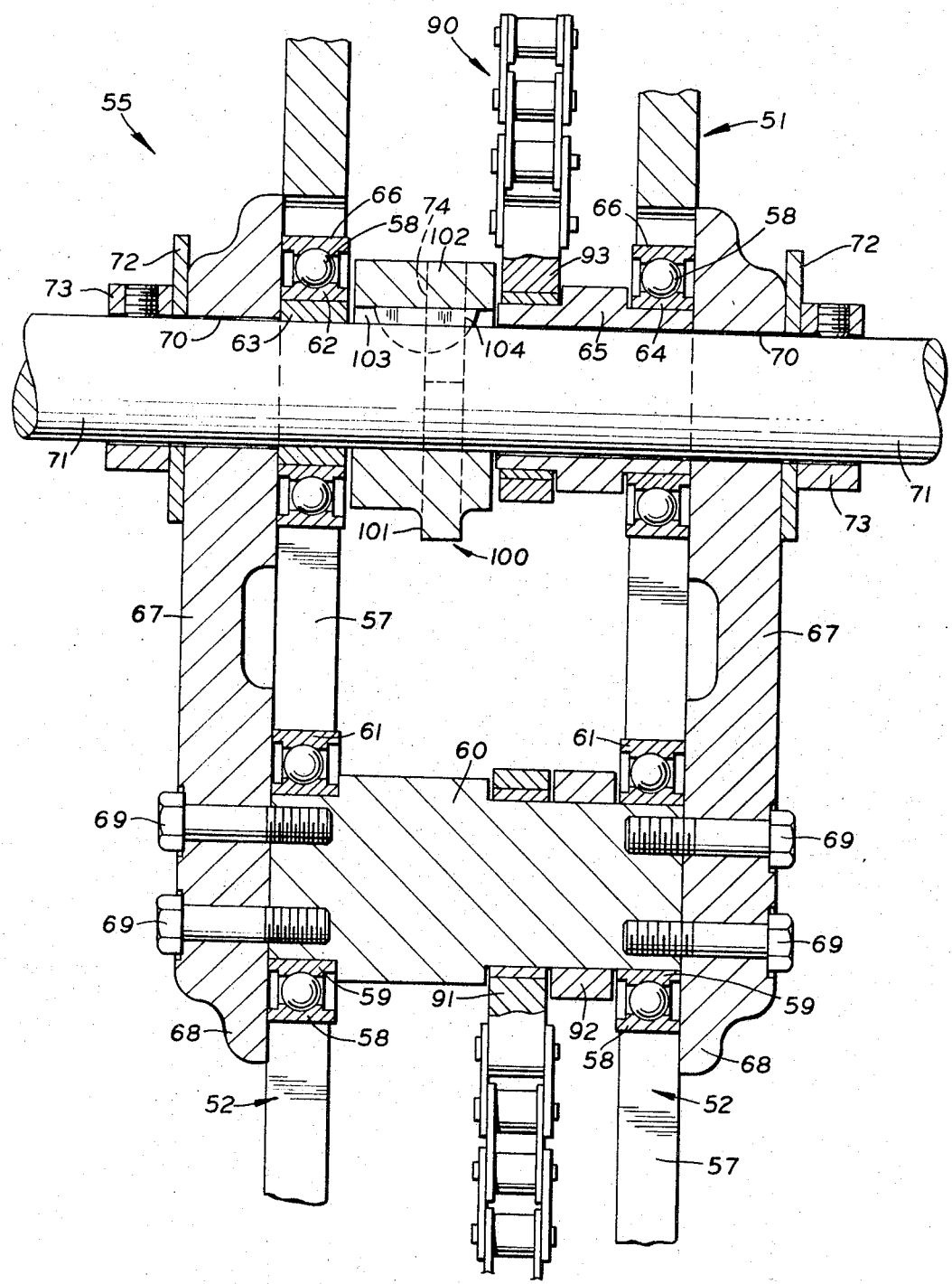
FIG. 5 is an enlarged sectional view through the apparatus carriage, taken substantially as indicated on line 5—5 of FIG. 1.

Referring to FIG. 5, at the leading or forward end of the carriage 55, the two bearing races 59 are press fitted on the ends of a cross block 60. The two leading bearing journals 61 rotate between the side surfaces of the slot legs. At the trailing or rearward end of the carriage 55, one bearing race 62 is press fitted on a collar 63. The opposite bearing race 64 is press fitted on a spacer block 65. The two following bearing journals 66 also rotate between the side surfaces of the slot legs.

The carriage 55 has side bars 67. The leading end of each side bar has an enlarged circular boss 68 capping the leading roller means 58 and secured to the cross block 60 as by fastening bolts 69. The following end of each side bar 67 has a bore 70 therethrough rotatably receiving a mounting shaft 71 for the conveyor arms. The bearing collar 63 and the spacer block are rotatably fitted on the shaft 71. The side bars 67 are further secured to the carriage 55 as by large washers 72 and mating lock collars 73 clamping the shaft laterally on either side of the side bars 67. During upward movement of the carriage 55 (as described in detail below) rotation of the mounting shaft 71, so as to drop a cured tire onto the lower mold, is prevented by a stop lever 74 extending laterally of the carriage 55 and engaging against the stop block 60.

Figure 2:
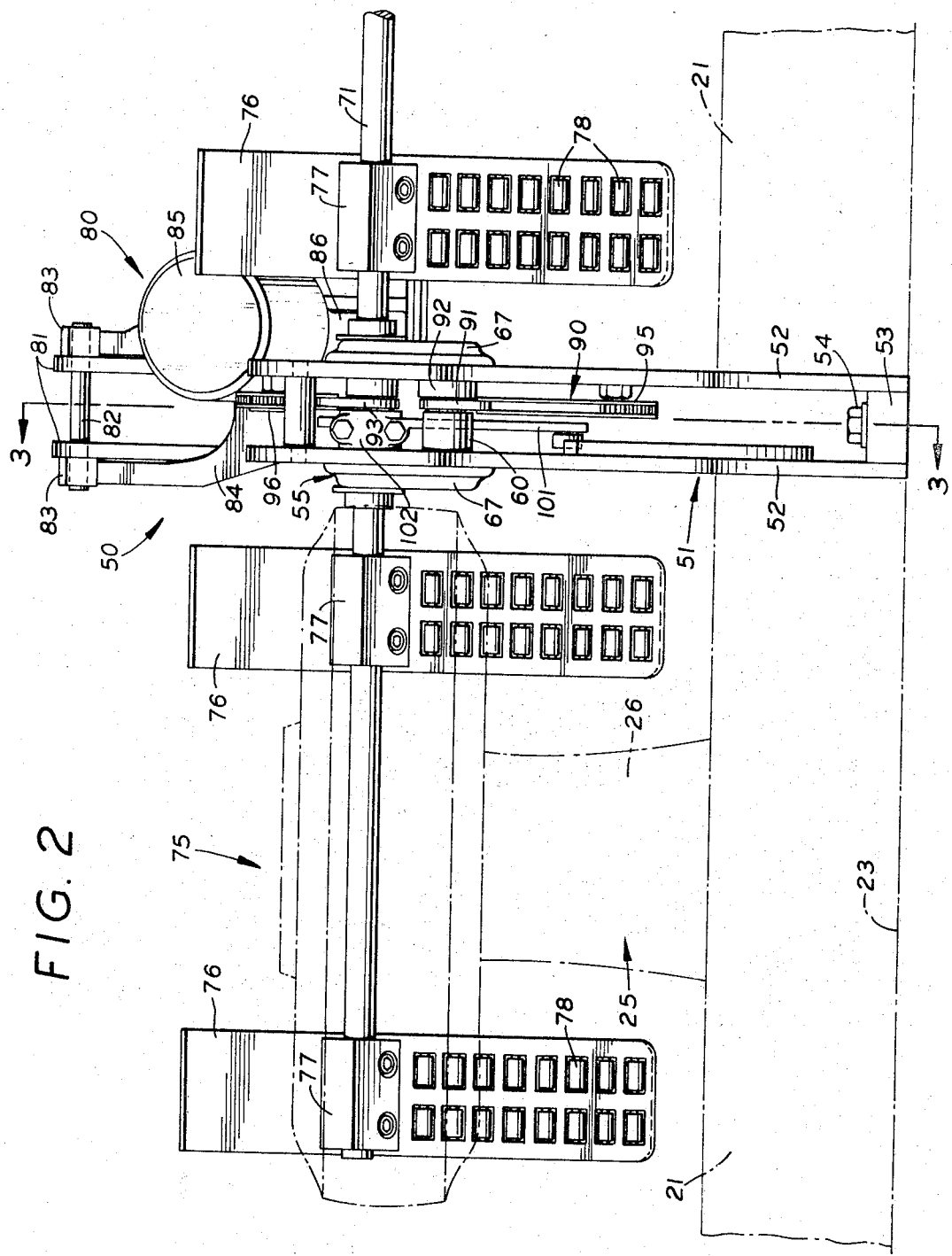
FIG. 2 is a rear elevation taken along line 2—2 of FIG. 1 showing the unloader in the position of FIG. 1.

As best shown in FIG. 2, the conveyor arm mounting shaft 71 extends a suitable distance laterally from either side of the unloader carriage 55 and is rotatable in relation to the carriage. Each set of conveyor arms 75 is formed by generally rectangular elements 76 mounted on the shaft 71 as by bolt secured clamp blocks 77. The clamp blocks are adjustable longitudinally along the shaft to accommodate various width cured tires. As shown, the forward end of each conveyor element 76 carries a series of small diameter friction reducing rollers 78. Alternatively, the upper or tire engaging surface of each element 76 could be coated with a friction reducing plastic material.

The carriage drive mechanism 80, for moving the carriage 55, the rotatably mounted support shaft 71 and the conveyor arms 75 thereon, through the several operating positions, is a "pivoted-motor" drive and is best shown in FIGS. 1, 2 and 5. The upper end of each stanchion side plate 52 has a rearwardly directed ear 81. Between the ears 81 is a fixed cross pin 82 movably mounting the yoke ears 83 of a drive base plate 84. The plate 84 carries an electric motor 85 driving a gear train or reducer 86 having an output shaft 87 mounting a drive sprocket 88. The drive base plate 84, suspended from the cross pin 82 provides a floating or free-hanging mounting for the drive elements 85–88. A torsion spring 89, connected between a side plate 52 from a point adjacent the apex of the slot legs 56 and 57 and extending upward to the base plate 84, provides tension to urge the movably mounted drive elements forwardly of the stanchion 51.

The drive sprocket 88 engages the teeth of a tensioned link chain or power transmission means 90. One end of the chain 90 is connected as by a rotatable collar 91 to the cross block 60 of the carriage 55. A spacer 92 around the cross block 60 separates the chain connection from the adjacent roller means 58. The other end of the chain 90 is connected as by a rotatable collar 93 to the spacer block 65 of the carriage 55.

The power transmission chain 90 is trained around a series of guide idlers mounted on one of the stanchion side plates 52. There is an upper idler 94 located forwardly of the side plate ears 81 and above the perpendicular slot leg 56. A lower idler 95 is located adjacent the apex of the V-shaped slot as defined by the slot legs 56 and 57. A rear idler 96 is located behind and slightly above the divergent slot leg 57.

During movement of the carriage 55 by the pivoted-motor drive mechanism 80 and the power transmission means 90, the conveyor arms 75 are directed and positioned by a guide system 100. Referring to FIG. 5, the conveyor arm mounting shaft 71 carries between a roller means 58 and the spacer block 65, a guide arm 101. The arm 101 has a split hub portion 102 with a keyway 103 for insertion of a key 104 securely attaching the arm to the shaft 71. The mounting shaft stop lever 74 is preferably formed as a lateral extension on the arm 101.

Figure 3:
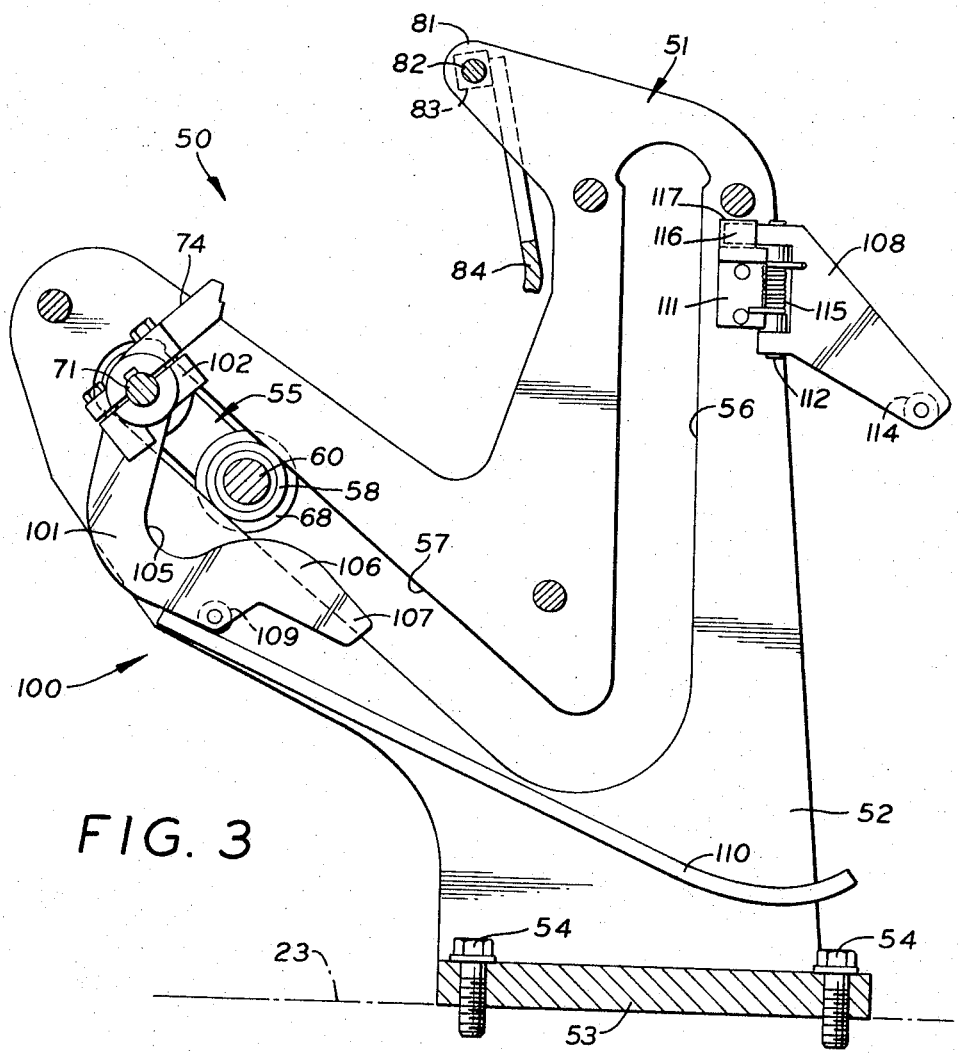
FIG. 3 is a fragmentary side elevation showing stanchion details taken substantially as indicated on line 3—3 of FIG 2.

As best shown in FIG. 3, the arm 101 of the guide system 100 has a generally sinuous shape and has sufficient weight so as to tend to rotate the mounting shaft 71 and the conveyor arms downward toward the center mechanism 25. Extending from the shaft mounting hub 102 the arm 101 includes a relieved medial portion 105 bending concavely away from the leading roller means 58. The relieved portion 105 is provided so that the guide arm 101 will not interfere with movement of the carriage 55 through the apex of the V-shape slot as defined by the slot legs 56 and 57.

The head portion 106 of the arm 101 forms a pawl having a laterally divergent tongue 107. During upward movement of the carriage 55 (to the position illustrated in FIG. 10), the guide arm tongue 107 cams and bypasses a spring biased catch element 108 mounted laterally or ahead of the perpendicular slot legs 56.

Obversely of the guide arm relieved portion 105, the underside of the arm 101 carries a roller 109 engaging a downwardly directed ski-shaped guide or track 110 mounted on a stanchion side plate 52. The track 110 supports the roller 109 on the weighted guide arm during movement of the carriage 55 along the divergent slot leg 57 and the contour of the track thereby directs or determines the entrance path of the conveyor arms 75 into the area of the center mechanism 25.

Figure 4:
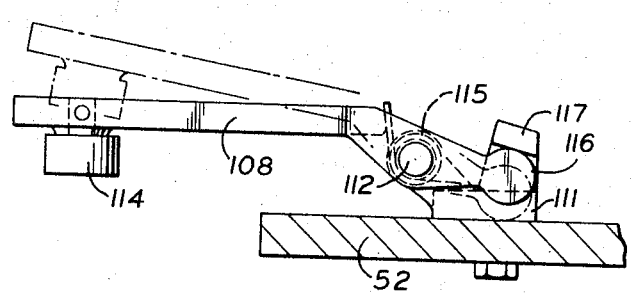
FIG. 4 is a plan view showing details of the apparatus, taken substantially as indicated on line 4—4 of FIG. 1.

Referring also to FIGS. 4, 6 and 7, the catch element 108 of the guide system 100 functions to restrain the guide arm head portion 106 only during downward movement of the carriage 55 (from the position of FIG. 10 toward the position of FIG. 11), so that the conveyor arms 75 will be quickly and sharply tilted downwardly and rearwardly to discharge the cured tire from the press. The catch element 108 has a base block 111 attached to a stanchion side plate 52. The block 111 has a pin 112 mounting the inner end of a movable catch arm. The outer end of the catch arm carries a roller 114. A torsion spring 115, encircling the pin 112, provides bias to direct the catch roller 114 directly forward of the stanchion 51 (the full line position of FIG. 4), the free end 116 of the catch element 108 being confined by a stop surface 117 on the upper side of the base block 111.

Figure 10:
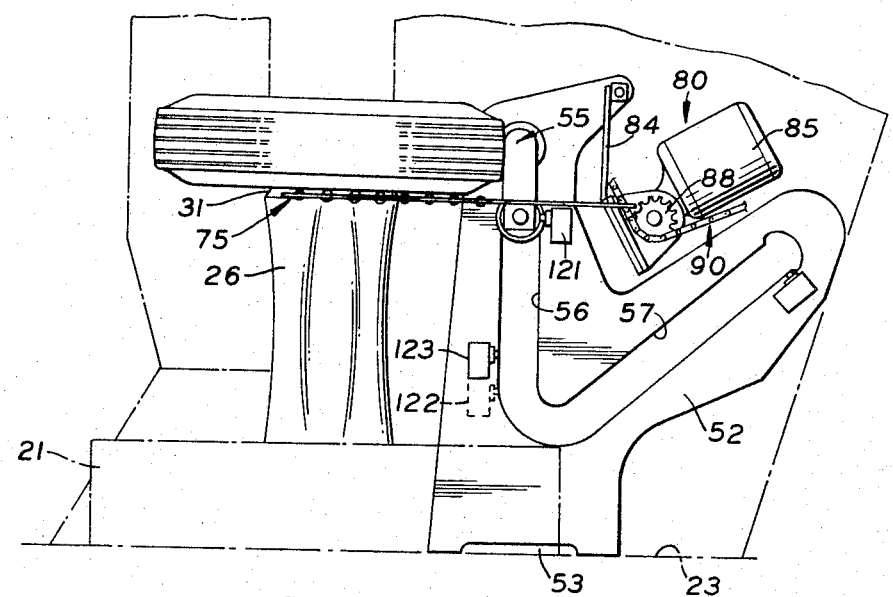
Figure 11:
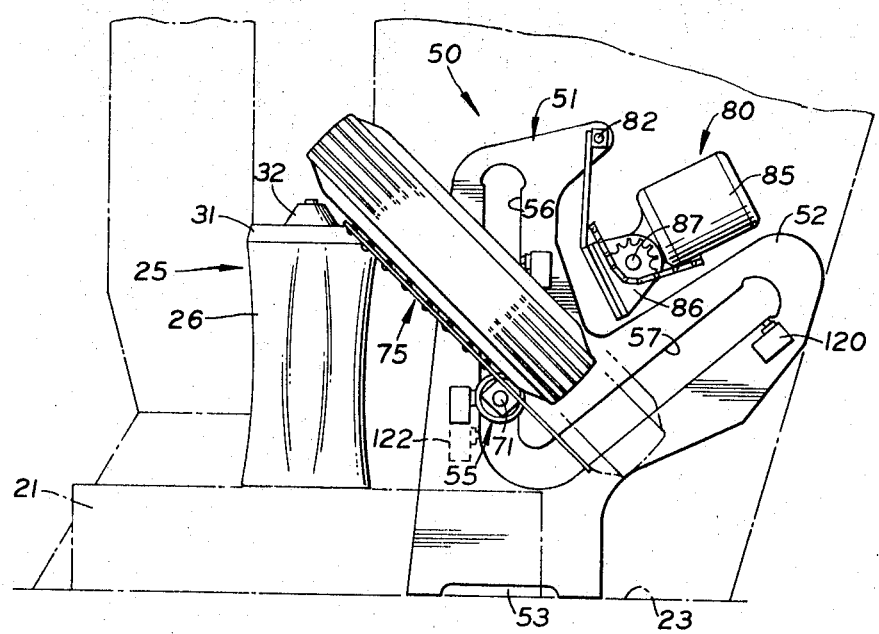

As the carriage 55 is raised within the perpendicular slot leg 56, the divergent tongue 107 of the guide arm 101 engages the catch roller 114 and cams the catch element 108 to one side (the chain line position of FIG. 4) permitting the carriage 55 to continue upward movement (toward the position of FIG. 10).

Referring to FIG. 6, when the carriage 55 has reached the uppermost extent of movement within the perpendicular slot leg 56, the guide arm 101 will be extending laterally forward, with the head portion 106 above the roller 114 on the catch element (the full line position of FIG. 6). Downward movement of the carriage 55 will cause the guide arm head 106 to engage the catch roller. Continued downward movement of the carriage will result in a rotating of the shaft 71 so that the conveyor arms 75 are inclined to discharge the cured tire (the chain line position of FIG. 6). Still further movement of the carriage 55 clears the guide arm 101 from the catch element 108 whereupon the weight of the guide arm, adding to the weight of the conveyor arms 75, will restore the conveyor arms to the entrance planes.

Electrical controls

The electric drive motor 85 of the drive mechanism 80 may be connected by any suitable conduit to a power of supply. The use of electric power rather than the hydraulic or fluid press actuators of prior press unloaders greatly simplifies press installation.

The movement of the conveyor arms 75 forwardly from the "passive" position (FIG. 1) through the sequential "working" positions (FIGS. 8-11) may be conveniently and adjustably controlled by suitable electrical switches mounted on the stanchion 51 and connected into the power supply to the motor 85.

Referring to FIG. 1, an electric switch 120 may be used to stop the carriage 55 when returned to the outermost extent of the divergent slot leg 57. An electric switch 121 may be used to stop carriage 55 when raised to the uppermost extent of the perpendicular slot leg 56. For further variations in the conveyor arm movement, an electrical switch 122 may be used to momentarily delay or stop the arms at a low point around the center mechanism 25, before contact with the cured tire. Still another switch 123 may be used to delay the return movement of the carriage when the arms 25 are in the tilt position.

The various switches 120–123, or other switches if desired are used, are preferably actuated by a striker element affixed to the carriage 55. For example, radiused ends of a side bar 67 could be suitably adapted to actuate electrical switches.

A production model of an improved unloader 50, embodying the concepts of the invention, has been shown and described. However, the invention need not be limited to the exact forms as described so long as the general features and relative arrangement thereof are maintained. Therefore, the true scope of the invention should be determined by the scope of the following claims.

What is claimed is:

1. An unloader (50) for removing cured tires from a press for shaping and curing tires, said press having a lower mold section (21) and center mechanism (25) adapted to elevate a cured tire above a lower mold section, said unloader having a stanchion (51) attached to the frame of said press adjacent a lower mold section and conveyor arms (75) positioned laterally of said stanchion for lifting and discharging a cured tire away from said center mechanism, characterized in that, said stanchion has a downwardly pointed slot defined by a perpendicular leg (56) oriented substantially parallel to the axis of said center mechanism and a divergent leg (57) directed away from the axis of said center mechanism, said stanchion slot legs (56, 57) support and guide a movable carriage (55), said carriage rotatably mounting said conveyor arms (75), said carriage is moved within said slot legs by a drive mechanism (80) mounted on said stanchion and actuating a tensioned power transmission means (90) connected to the carriage, said conveyor arms are directed and positioned by a guide system (100) on said stanchion.

2. An unloader according to claim 1 wherein said carriage (55) rotably mounts a shaft (71) extending laterally of said carriage, said conveyor arms (75) are mounted on said shaft (71) and said guide system (100) includes a weighted guide arm (101) secured to said shaft.

3. An unloader according to claim 1 wheerin said drive mechanism (80) is mounted on said stanchion above said perpendicular slot leg (56) and said power transmission means (90) is tensioned by a spring (89) extending from adjacent the apex of the slot legs (56 and 57) upward to the drive mechanism (80).

4. An unloader according to claim 1 wherein said carriage (55) is generally rectangular having a four-point suspension by roller means (58) fitting within said slot legs (56, 57), a shaft (71) extending laterally of said carriage is rotatably mounted by parallel roller means (58), said conveyor arms (75) are mounted on said shaft (71), and said guide system includes a weighted guide arm (101) secured to said shaft between said roller means (58).

5. An unloader according to claim 2 wherein said guide arm (101) has a sinuous shape with a hub portion (102) secured to said shaft and a relieved medial portion (105) bending concavely away from said carriage and a head portion (106) forming a pawl, and said guide system (100) includes a ski-shaped track (110) on said stanchion (51) supporting said guide arm (101) during movement of said carriage (55) along said divergent slot leg (57) and a catch element (108) on said stanchion laterally of said perpendicular slot leg (56) and restraining said guide arm head portion (106) only during downward movement of said carriage (55) within said perpendicular slot (56).

6. An unloader according to claim 3 wherein said transmission means (90) is a link chain trained around a series of guide idlers mounted on said stanchion (51), there being an upper idler (94) located above the perpendicular slot leg (56), a lower idler (95) located adjacent the apex of the slot legs (56, 57), and a rear idler (96) located behind and above the divergent slot leg (57).

7. An unloader according to claim 1 wherein said drive mechanism (80) includes an electric motor (85).

8. An unloader according to claim 7 wherein said electric motor (85) is controlled by electric switches (120, etc.) on said stanchion (51) and actuated by movement of said carriage (55) within said slot legs (56, 57).

References Cited

UNITED STATES PATENTS

| | | | |
|---|---|---|---|
| 2,832,991 | 5/1958 | Soderquist | 18—2 |
| 2,832,992 | 5/1958 | Soderquist | 18—17 X |
| 3,141,191 | 7/1964 | Soderquist | 18—2 |
| 3,222,716 | 12/1965 | Harris | 18—2 |

FOREIGN PATENTS 1,158,243  11/1963  Germany.

J. SPENCER OVERHOLSER, *Primary Examiner.*

J. HOWARD FLINT, JR., *Examiner.*

UNITED STATES PATENT OFFICE
CERTIFICATE OF CORRECTION

Patent No. 3,336,630                      August 22, 1967

Leslie E. Soderquist

It is hereby certified that error appears in the above numbered patent requiring correction and that the said Letters Patent should read as corrected below.

Column 1, line 9, strike out "the"; column 2, line 27, for "bove" read -- above --; column 4, line 2, strike out "the", second occurrence; column 5, line 12, for "V-shape" read -- V-shaped --; column 6, line 21, for "unolader" read -- unloader --; line 51, for "rotably" read -- rotatably --; line 55, for "wheerin" read -- wherein --; column 7, line 8, after "said" insert -- power --.

Signed and sealed this 11th day of March 1969.

(SEAL)
Attest:

Edward M. Fletcher, Jr.                         EDWARD J. BRENNER
Attesting Officer                             Commissioner of Patents